Dec. 31, 1935. G. F. MICHOT-DUPONT 2,025,882
METHOD FOR THE DISTILLATION OF SOLID COMBUSTIBLES
Filed Aug. 25, 1931
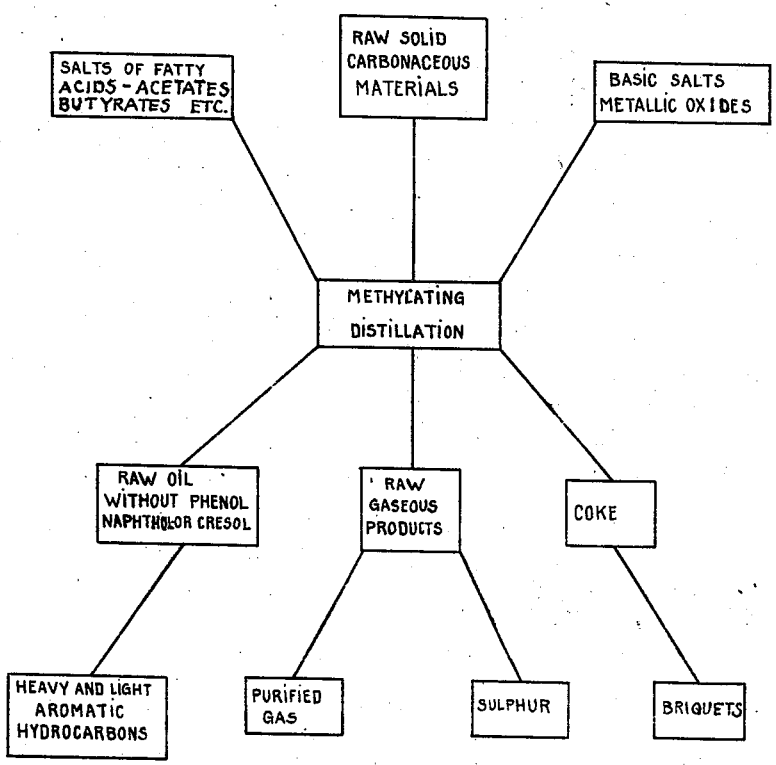
INVENTOR
Georges Francis Michot-Dupont
ATTORNEYS
Synnestvedt + Lechner Patented Dec. 31, 1935

2,025,882

UNITED STATES PATENT OFFICE 2,025,882

METHOD FOR THE DISTILLATION OF SOLID COMBUSTIBLES

Georges Francis Michot-Dupont, Vincennes, France, assignor to "Physical Chemistry Research Cy", Wilmington, Del., a corporation of Delaware Application August 25, 1931, Serial No. 559,342
In Belgium July 29, 1931

9 Claims. (Cl. 202—34)

The present invention relates to methods for the distillation of solid combustibles such as coals, lignites, peats, etc.

It has as object, chiefly, to utilize said materials more advantageously than hitherto to eliminate from them elements, sometimes inconvenient, such as cresols, naphthols, sulphur derivatives, etc. and to improve in a general way their distillation products in quality and in quantity.

It consists chiefly in distilling materials of the kind in question in the presence of substances such as the alkaline or earth alkaline salts of fatty acids, except formic acid, as well as suitable mixtures providing the salts of the above kind, these substances directly furnishing under suitable conditions of temperature, pressure and time, by mutual reaction and in the presence or not of catalysts, sufficient numbers of molecules containing hydrocarbon groups ($CH_n$) which are substituted for phenol groups in the said materials to thus give lighter hydrocarbons and to also permit the condensation of several aromatic molecules with the eventual and simultaneous disappearance of phenol functions.

It consists apart from this main idea of certain other conceptions which are employed at the same time and which will be further explained below.

According to a second method—more particularly for the case where distillation of the materials of the kind in question takes place in the presence of catalysts—these catalysts are constituted by metallic oxides, for example oxide of iron, mixed with particles of the corresponding metal.

According to a third conception—more particularly for the case in which the materials to be treated contain realitively large quantities of sulphur—distillation is carried out in a basic medium by adding to the materials taking part in the reaction bases, basic salts or salts of basic reactions and more particularly alkaline salts, for example sodium carbonate, or alkaline earth salts.

The invention will now be described in the following description which it is to be understood is only given by way of example. The accompanying drawing presents a schematic showing or ideogram by means of which the process described hereinafter may be better understood.

In the preferred course distillation of solid combustible is carried out in the presence of substances which directly or by mutual reaction, in the presence or not of catalysts, furnish hydrocarbon groups ($CH_n$) capable of being substituted for the phenol groups of the treated materials.

It is to be understood that if the hydrocarbon groups are combined in other molecules having other chemical properties the process is equally well applicable.

Among these substances can be named salts of fatty acids saturated or not, such as acetic, butyric, oleic and stearic acids and the like or acids of the naphthene group; further, alkaline salts (more particularly sodium salts) alkaline earth salts (more particularly calcium salts) as well as appropriate mixtures for giving these acids or salts by double decomposition. These substances are normally used in such quantities that the amounts of the heavy parts of the treated materials are proportioned to the molecular weight of the fatty acid or the derivative which is used.

Distillation can advantageously be carried out in the presence of catalysts or activators and it has been found that the reactions are particularly favourable when use is made, according to the invention, of metallic oxides, for example the oxide of iron or of a metal in the same group as iron, with which can be mixed as desired small particles of the corresponding metal. Small particles of the metals alone can equally well be used for example iron filings. The use of a metallic oxide or of the metal alone necessitates in general an excess of this substance, the amount influencing to a marked degree the percentage of different fractions in the distilled products obtained. To afford suitable contact between the materials to be distilled and the catalysts, mainly when granular or crushed materials are used and when the catalyst is composed of fine metallic particles, it may be better to spray the catalysts onto the materials.

When materials containing normal proportions of sulphur are used and recourse is had in order to obtain hydrocarbon groups to an alkaline or alkaline earth salt of a fatty acid, for example an aqueous solution of ordinary calcium acetate the desired hydrocarbon groups are obtained due to the breaking up of this product under the action of heat and calcium carbonate remains.

It is obviously not possible to put into formulæ the reactions taking place during the distillation since substances are formed and immediately break up. The principal reactions occurring however can be put down as the following.

The organic residues of acetate and eventually, the ketone and acetone formed give up hydrocarbon groups which combine with the nascent vapours to augment the proportion of light products.

It has been attempted to follow the reactions concerned in the exchange of the hydrocarbon groups by altering the quantity of the reacting substances. It has been found by the afflux of liquid condensed about 140° C. that an increase in the quantity of xylols in the condensed substances is obtained and at the same time a very pronounced diminution in the portions passing over in the vicinity of the boiling point of the cresols. Further in making up a kind of lignite with lignite coke impregnated with chemically pure para cresol, acetate of lime and iron there have been obtained by distillation and mixed with the pure recovered para-cresol, light benzene carbides beginning to distill at 139° C. in the vicinity of the boiling point of para-xylene which is a product of the methylation of the cresols and a residue of heavy products distilling above 300° C. This appears to indicate on the one hand a methylation of the cresol and on the other hand a condensation of its molecules into more condensed products due to the intervention of hydrocarbon groups from the calcium acetate. The method is general for salts other than acetates, for example formates and the reactions are of the same type and comparable with the preceding.

Calcium carbonate obtained by the decomposition of the acetate of calcium tends to fix the sulphur and it is assumed that the sulphide of calcium thus produced, not carried off with the oils, forms part of the decomposition products of which $H_2S$ escapes with the gases so that it can be easily eliminated by known methods. As regards the sulphur which remains combined in the oils which distill it occurs here for most part in a form particularly easy to eliminate by acid or alkaline washes.

It is obvious that the quantity of calcium acetate or the like varies according to the quantity of sulphur present. Also for reasons of economy or such, according to the invention, other means can be used retaining all or at least a part of the sulphur in the residue which has not distilled in addition to the above mentioned salt. This can be obtained by operating in a basic medium obtained by the addition to the mixture of materials undergoing distillation from 2 to 5 per cent quick lime, alkaline salts (sodium carbonate), alkaline earth salts, basic salts or from a basic reaction or similar bases. As the distillation of the combustible is often effected with the injection of water vapour it obtains in the case for example of sodium carbonate that the sulphide of sodium is less easily decomposed by the water vapour than the sulphide of calcium and that appreciable quantities of sulphur are thus retained.

Below are given several examples of characteristic applications of the invention and of the way in which these are carried out in the particular cases.

*Example 1.*—100 kgs. of sulphurous lignite containing for example 8 per cent of sulphur are pounded up. About 3 kgs. of ordinary calcium acetate mixed with the minimum of water necessary to assure perfect impregnation are then carefully added. Into the mixture thus obtained is introduced about 2 kgs. of iron filings. Distillation takes place in a retort at a pressure about atmospheric preferably a little below, becoming equal or even above it when the passage of the light products is too rapid. The retort is connected with an apparatus for condensing the vapours evolved, similar to those in use in the illuminating gas industry or in the distillation of oil. The apparatus is provided with means for purifying the gases or vapours which pass through it, these means comprising for example an absorber containing a substance called "Laming mixture" commonly used in the gas industry. The mixture to be distilled is introduced into the retort. Heating is commenced and as soon as the temperature of the mass begins to rise for example when it has reached 100° C. water vapour is injected at a low pressure (of the order of 300 grms. per sq. cm.) as is common in the usual vapour distillations. Heating is continued until no more volatile products pass off, that is to say to about dull red heat (about 600–700° C.) the residue being composed of coke lignite. If during the heating the product resulting from the condensation of the evolved vapours is collected, it is found that this product comprises an oil free from a sulphurous smell and from which can be obtained an important percentage of light products (analogous with automobile petrol) a burning oil distillate and a residual paraffin oil equally free from the odour of sulphur. The products contain no more than traces of cresols and naphthols.

*Example 2.*—Peat is dried to 30% water after the addition of reagents in such quantities that when once dried to 30% water it contains 3% of calcium acetate, 2% iron and 2% sodium carbonate. It is treated in a manner analogous to that of Example 1. By distillation a yield of 13.6% of oil in proportion to the weight of the dried peat is obtained which is at least double the usual yield. In a particular case the product obtained, noticeably ameliorated, contains no more than 5% of cresols in the portion passing over below 300° C.

The processes just described have considerable advantages over those already in existence since they permit among other things the obtaining of a larger quantity of liquid products of distillation from a combustible solid and a considerable diminution and sometimes total transformation of the cresols or naphthols chiefly to the advantage of the light products. In the cases where the processes are applied to materials of the kind having a large proportion of sulphur, the latter is completely or in part eliminated and in any event is put into an easily extractable and often into a nonodorous form.

What I claim is:—

1. In the distillation of coal to produce low boiling point liquid hydrocarbons, the step of substituting methyl groups for phenol groups by heating coal to a temperature above that at which acetone decomposes and below about 600° C. in the presence of an alkaline salt of a fatty acid adapted to supply said methyl groups, the substitution being effected in the presence of a catalyst comprising an oxide of a metal of the iron group.

2. In the distillation of coal to produce low boiling point liquid hydrocarbons, the step of substituting methyl groups for phenol groups by heating coal to a temperature above that at which acetone decomposes and below about 600° C. in the presence of an alkaline salt of a fatty acid adapted to supply said methyl groups, the substitution being effected in the presence of a basic salt forming a basic medium, the salt being present in amounts from about 2% to about 5%.

3. The method for deriving low boiling point hydrocarbons from coal which method includes heating the coal to a reaction temperature above that at which acetone decomposes and below about 600° C. in the presence of an alkaline salt of a fatty acid adapted to supply hydrocarbon groups capable of being substituted for phenol groups of the coal being treated, the reaction further being conducted in the presence of a basic salt forming a basic medium.

4. The method for deriving low boiling point hydrocarbons from coal which method includes heating the coal to a reaction temperature above that at which acetone decomposes and below about 600° C. in the presence of an alkaline salt of a fatty acid adapted to supply hydrocarbon groups capable of being substituted for phenol groups of the coal being treated, the reaction further being conducted in the presence of sodium carbonate forming a basic medium.

5. The method for deriving low boiling point hydrocarbons from coal which method includes heating the coal to a reaction temperature above that at which acetone decomposes and below about 600° C. in the presence of an alkaline salt of a fatty acid adapted to supply hydrocarbon groups capable of being substituted for phenol groups of the coal being treated, the reaction further being conducted in the presence of a basic salt forming a basic medium, which salt is present in amounts from about 2% to about 5%.

6. The method for deriving low boiling point hydrocarbons from coal which method includes heating the coal to a reaction temperature above that at which acetone decomposes and below about 600° C. in the presence of an alkaline salt of a fatty acid adapted to supply hydrocarbon groups capable of being substituted for phenol groups of the coal being treated, the reaction further being conducted in the presence of a metallic oxide.

7. The method for deriving low boiling point hydrocarbons from coal which method includes heating the coal to a reaction temperature above that at which acetone decomposes and below about 600° C. in the presence of an alkaline salt of a fatty acid adapted to supply hydrocarbon groups capable of being substituted for phenol groups of the coal being treated, the reaction further being conducted in the presence of an oxide of a metal of the iron group.

8. The method for deriving low boiling point hydrocarbons from coal which method includes heating the coal to a reaction temperature above that at which acetone decomposes and below about 600° C. in the presence of an alkaline salt of a fatty acid adapted to supply hydrocarbon groups capable of being substituted for phenol groups of the coal being treated, the reaction further being conducted in the presence of iron oxide.

9. The method for deriving low boiling point hydrocarbons from coal which method includes heating the coal to a reaction temperature above that at which acetone decomposes and below about 600° C. in the presence of an alkaline salt of a fatty acid adapted to supply hydrocarbon groups capable of being substituted for phenol groups of the coal being treated, the reaction further being conducted in the presence of a basic salt forming a basic medium and in the presence of a metallic oxide.

GEORGES FRANCIS MICHOT-DUPONT.